United States Patent [19]

Lerner et al.

[11] Patent Number: 5,261,054
[45] Date of Patent: Nov. 9, 1993

[54] SYSTEM FOR STORING A HISTORY OF SAMPLED POINTER SIGNALS WHEN A POINTER INTERRUPT ROUTINE IS INTERRUPTED BY A HIGHER PRIORITY INTERRUPT

[75] Inventors: James P. Lerner, Newton; Alan E. Bell, Westford, both of Mass.

[73] Assignee: Sun Microsystems, Inc., Mountain View, Calif.

[21] Appl. No.: 672,140

[22] Filed: Mar. 18, 1991

Related U.S. Application Data

[63] Continuation of Ser. No. 288,298, Dec. 22, 1988, abandoned.

[51] Int. Cl.⁵ .................... G06F 3/03; G06F 3/033
[52] U.S. Cl. .................... 395/275; 395/800; 364/709.11; 364/927.61; 364/929.12; 364/927.6; 364/927.66; 364/DIG. 2; 364/236.8; 364/237.1; 345/157; 345/163
[58] Field of Search .............. 395/275, 800, 133; 364/188, 190, 709.11; 340/706, 709, 710

[56] References Cited

U.S. PATENT DOCUMENTS

| | | | |
|---|---|---|---|
| 4,458,311 | 7/1984 | Clements et al. | 364/200 |
| 4,691,200 | 9/1987 | Stephany | 340/784 |
| 4,692,858 | 9/1987 | Redford et al. | 364/200 |
| 4,755,808 | 7/1988 | Bullock et al. | 340/709 |
| 4,819,189 | 4/1989 | Kikuchi et al. | 364/521 |
| 4,859,995 | 8/1989 | Hansen et al. | 340/710 |

*Primary Examiner*—Thomas C. Lee
*Assistant Examiner*—Paul Harrity
*Attorney, Agent, or Firm*—Blakely Sokoloff Taylor & Zafman

[57] ABSTRACT

In a computer system, an arrangement for storing condition signals indicative of the position of a pointing device and the condition of a button thereof, apparatus for comparing present condition signals generated by a pointing device with stored signals indicative of a previous condition of the pointing device, and apparatus responsive to the comparison of present condition signals generated by a pointing device for generating a pointer interrupt signal only if a change in the pointer condition has occurred.

17 Claims, 4 Drawing Sheets

| X POSITION |||
|---|---|---|
| Y POSITION |||
| BUTTON 1 | BUTTON 2 | BUTTON 3 |
| TIMESTAMP |||

*Figure 3*

SYSTEM FOR STORING A HISTORY OF SAMPLED POINTER SIGNALS WHEN A POINTER INTERRUPT ROUTINE IS INTERRUPTED BY A HIGHER PRIORITY INTERRUPT

This is a continuation of application Ser. No. 07/288,298 filed Dec. 22, 1988, now abandoned.

BACKGROUND OF THE INVENTION

1. Field of the Invention

This invention relates to computer operating systems and, more particularly, to improvements in operating systems for controlling pointing devices.

2. History of the Prior Art

In a typical computer system utilizing bitmapped graphics, a mouse or other pointing device is used for accurately creating and revising graphic images. Basically, such a device provides signals accurately defining a position at which the pointing device is placed and the condition of one or more switches related to the device, usually referred to as buttons. In many of the more advanced systems, a mouse is also used for effecting many of the operations of various application programs by use of menus which may have operations selected by pointing to an item with a cursor controlled by the mouse and operating one or more of the buttons.

In the usual operating system utilizing a mouse or functionally similar pointing device (which are referred to hereinafter by either term), the pointing device generates interrupt signals approximately each one-fortieth of a second. Each of these signals causes the operating system to pause in its operation, sense the device position, store the new device position, redraw the cursor position, and return to the interrupted operation. This is a useful operation when either the pointing device position or the status of a button has changed. However, statistically, such changes occur much less often than every one fortieth of a second. Consequently, a substantial amount of system operation time is lost to the mechanism by which the pointing device condition is updated.

As is well known to those skilled in the art, in order to make an operating system functional, there must be many levels of interrupts. That is, for an operating system to function, some level of interrupt must take precedence over all other levels of interrupts and other interrupts must, in like manner, have their own precedence with regard to the other interrupts for an operating system to function. Thus, the mouse interrupt may, in many cases, be delayed in execution because of some other process having precedence and preempting the system for some period of time.

Moreover, in many of the more advanced computer systems which utilize pointing devices and provide for multitasking of operations, more than one program or process may be operating at the same time. This is usually accomplished by an operating system which allows one process to utilize the central processing unit (CPU) for a period, a second process to utilize the CPU for a second period, and so on, the sharing of the CPU hopefully being such that each process appears to the user to be running without interruption by the other processes. The operation of a such multitasking system requires many more levels of preemption and interrupts and often delays the redrawing of the cursor representing the pointing device position for long periods of time.

Certain application programs which make use of pointing devices include utility programs for accelerating the movement of the cursor representing the position of the pointing device on the output display. If the interrupt utilized to redraw the cursor on the output display is preempted during movement of the pointing device, the output for the pointing device described on the output display may well be substantially distorted.

It is, therefore, an object of the present invention to improve a computer operating system by decreasing the time utilized for pointing device updating.

It is another object of the present invention to provide an improved operating system for a computer including a mouse updating system which operates more rapidly than do those of prior art systems.

Another object of t is invention is to improve the mechanics by which a pointer position is updated in a computer operating system.

Another object of the present invention is to provide a pointing device interrupt system for use in computers which operates only in response to actual movement of the pointing device.

An additional object of the present invention is to provide an arrangement for remembering the positions to which a pointing device has been moved during an interim in which the position of the device has not been updated on the display so that the path previously taken by the device may be drawn as it occurred during that interim.

SUMMARY OF THE INVENTION

These and other objects of the invention are realized in an operating system in which the operating system reviews the present mouse position on a repeating basis and generates a system interrupt to update the pointing device position only in the case in which a change in the pointing device has occurred since the last review. In this manner, the system continues with its present operation until the mouse position changes so that the system need not update the mouse position or redraw the cursor on a constantly repeating timed basis. This significantly reduces th operating system overhead time allotted to the operation of the mouse.

This is accomplished in a particular computer system by memory for storing condition signals indicative of the position of a pointing device and the condition of a button thereof, means for comparing present condition signals generated by a pointing device with the stored signals indicative of a previous condition of the pointing device, and means responsive to the comparison of present condition signals generated by a pointing device with stored signals indicative of a previous condition of the pointing device for generating a pointer interrupt signal only if a change in the pointer condition has occurred.

In a specific adaptation of the invention, an arrangement is provided for storing a number of adjacent pointer positions over a period of time during which the mouse interrupt operation is preempted and the operating system is attending to other operations so that when the system returns to the pointing device to indicate its present position, various intervening positions may also be properly displayed.

These and other features and advantages of the present invention will become apparent to those skilled in the art upon reading the following detailed description in conjunction with the several figures of the drawing in which like designations hav been used for like components and operations throughout.

BRIEF DESCRIPTION OF THE DRAWINGS

FIG. 3 is a diagram of the information stored at a memory position in accordance with the invention.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to method steps for operating a computer in processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION OF THE INVENTION

Figure 4:
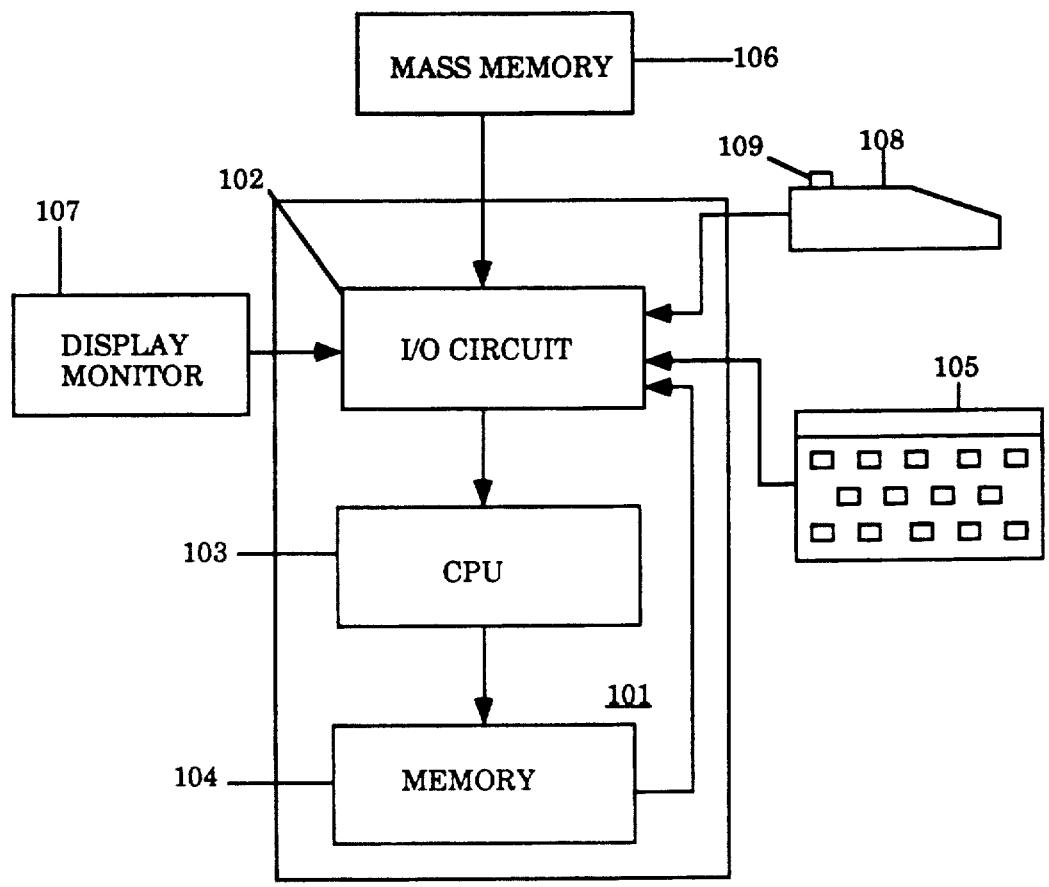
FIG. 4 illustrates a computer incorporating the teachings of the present invention.

Shown in FIG. 4 is a computer system 101 which comprises three major components. The first of these is the input/output (I/O) circuit 102 which is used to communicate information in appropriately structured form to and from the other parts of the computer 101. Also shown as a part of computer 101 is the central processing unit (CPU) 103 and memory 104. These latter two elements are those typically found in most general purpose computers and almost all special purpose computers. In fact, the several elements contained within computer 101 are intended to be representative of this broad category of data processors. Particular examples of suitable data processors to fill the role of computer 101 include machines manufactured by Sun Microsystems, Inc., Mountain View, Calif. Other computers having the capabilities may of course be adapted in a straightforward manner to perform the functions described below.

Also shown in FIG. 4 is an input device 105, shown in typical embodiment as a keyboard. If should be understood, however, that the input device may actually be a card reader, magnetic or paper tape reader, or other well-known input device (including, of course, another computer). A mass memory device 106 is coupled to the I/O circuit 102 and provides additional storage capability for the computer 101. The mass memory 106 may include other programs and the like and may take the form of a magnetic or paper tape reader or other well known device. It will be appreciated that the data retained within mass memory 106, may, in appropriate cases, be incorporated in standard fashion into computer 101 as part of memory 104.

In addition, a display monitor 107 is illustrated which is used to display messages or other communications to the user. Such a display monitor may take the form of any of several well-known varieties of CRT displays. A pointing device 108 is used to select command modes and edit the input data, such as, for example, the parameter to query the database, and provides a more convenient means to input information into the system. Pointing device 108 may also be equipped with a button or buttons 109 which expand the communication capabilities of the pointing device by increasing the number of commands it can generate.

As pointed out above, in the usual operating system utilizing a mouse or functionally similar pointing device, the mouse device generates interrupt signals approximately every one-fortieth of a second. Each of these signals causes the operating system to pause in its operation, sense the mouse position, store the new mouse position, redraw the cursor position, and return to the preceding operation. A substantial amount of time is lost in system operation to the means by which the mouse position is updated since the operation occurs forty times each second.

Figure 1:
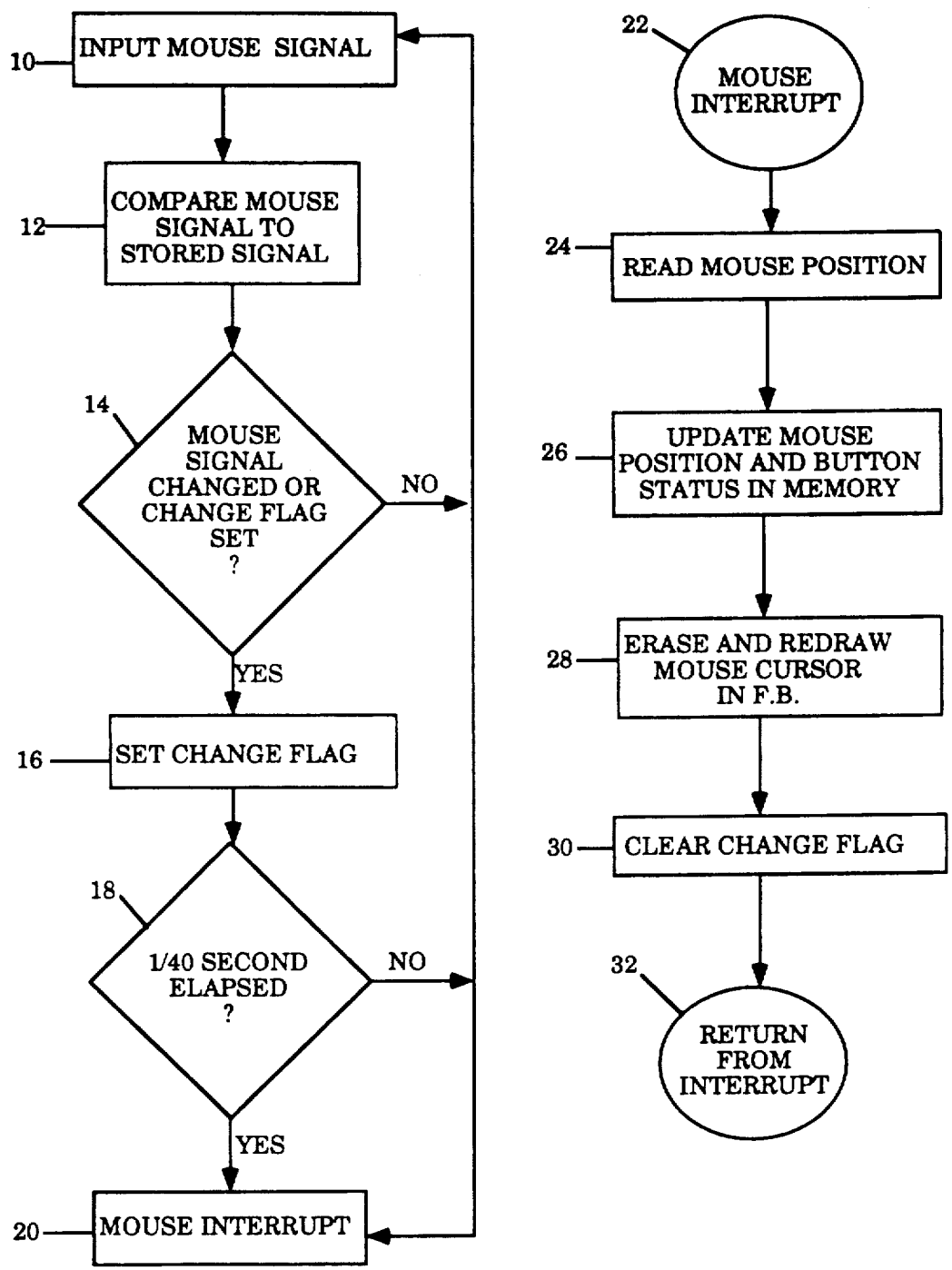
FIG. 1 is a flow chart illustrating the operation of a portion of an operating system in accordance with the present invention.

FIG. 1 illustrates a flow chart which may be used to explain the operation of the present invention which substantially reduces the delay in system operation due to mouse condition updating. In a system in accordance with the invention, a mouse interrupt is not generated unless the mouse has either moved or the condition of its buttons has changed. In the flow chart of FIG. 1, the mouse input signal is first received at step 10. This signal, as indicated above, includes the information by which the mouse position and the condition of its associated buttons is determined. At step 12, the incoming mouse signal is compared to the last mouse position and condition. The last mouse position is, in accordance with the preferred embodiment of the invention, stored as an entry in an array in memory.

FIG. 3 illustrates the information provided in a preferred embodiment of the invention to the particular memory position recording the last mouse condition. The information stored includes the X position of the mouse in absolute rectilinear coordinates, the Y position of the mouse in absolute rectilinear coordinates, the condition of a button one, the condition of a button two, the condition of a button three, and an indication of the time at which the last mouse condition occurred. Depending on the particular system and the particular mouse utilized, there may be one or more buttons. The preferred embodiment utilizes a three-button mouse, and one bit is stored for each button. As there is a substantial body of prior art explaining various mouse arrangements, no detailed description of a particular mouse is considered to be necessary to this description.

At a step 14, the result of the comparison which occurred at step 12 determines whether the operation ignores the present mouse condition or generates an interrupt to utilize the incoming mouse signals. If the condition of the mouse has not changed as indicated by the comparison with the stored mouse condition, then the operating system simply ignores the incoming mouse signal and returns to review the following mouse signals at step 10. In this manner, the entire mouse interrupt is bypassed if no change in mouse condition has occurred. If, on the other hand, the mouse condition has changed, the program moves to a step 16 to set a flag indicating that change in mouse condition has occurred. The change flag is set so that the mouse condition positions in memory are not overwritten during the process by incoming mouse condition signals.

The program next moves to a step 18 at which a determination is made whether one-fortieth of a second has passed since the last mouse condition update. If one-fortieth of a second has not passed since the last mouse condition update, the program simply recycles to step 10 to look for a new mouse condition. In this manner, a mouse interrupt can be generated no more often than each one-fortieth of a second. If one-fortieth of a second has passed since the last mouse condition update, the program moves to a step 20 to generate a mouse interrupt.

When a mouse interrupt is generated, the mouse interrupt subroutine or function is entered at a step 22. This subroutine is shown to the right in FIG. 1 of the drawing. The subroutine moves to a step 24 to read the new mouse position and the condition of the mouse buttons. The subroutine next moves to a step 26 to update in memory the mouse position, the button conditions, and the time the input occurred by providing to memory information in accordance with the illustration of FIG. 3. Finally, the subroutine moves to step 28 to erase and redraw the mouse cursor in the frame buffer of the computer system (not shown in the drawings) so that the mouse cursor position may be scanned to the output display. When step 28 is completed, the subroutine moves to a step 30 to clear the change flag previously set and then to a step 32 to return to the main program at step 10.

The advantages of the invention will be apparent to those skilled in the art. Rather than having to interrupt the operation of the CPU each one-fortieth of a second, the present arrangement allows the updating to occur only upon an actual change in the mouse condition. Thus, it is not necessary to update the mouse position and the button conditions in memory each one-fortieth of a second nor is it necessary to erase and redraw the mouse cursor in the frame buffer of the computer system each one-fortieth of a second. This provides a substantial saving in system operation time.

The arrangement of this invention may be used to more accurately draw the positions traversed by a mouse during intervals in which the mouse interrupt operation is preempted by interrupts of a higher level or by other processes of a multiprocessing operating system. Those familiar with the operation of a mouse with a computer having a bitmapped output display will recognize that the movement of the mouse is often less than optimal. That is, the mouse sometimes moves from physical position to physical position without all of the intervening positions being recorded on the output display. This occurs because the CPU is preempted during various intervals of the movement of the mouse; and, in prior art systems, mouse interrupts are generated only each one-fortieth of a second. If the mouse moves during a period when the CPU is preempted by a higher level interrupt or another process, then intervening positions of the mouse do not find their way to the output display.

This may have no effect on operation. For example, in a case where the mouse is merely moving from position to position, all that really needs to be recorded is the last position. However, if a graphic figure is being described by the mouse during the period of the preemption, the shape may be distorted; for example, the beginning and end points of an arc may be joined as a straight line if the mouse interrupt is preempted during the drawing of the arc by a process running in the background in a multiprocessing system.

Another situation in which a mouse interrupt is preempted and distortion occurs is that in which the particular application program includes software which accelerates the apparent speed of the mouse across the output display. In such situations, an interrupt which preempts the mouse interrupt often causes the movement of the mouse cursor on the output display to be severely distorted because the points describing the mouse path are not drawn at the proper time intervals.

Figure 2:
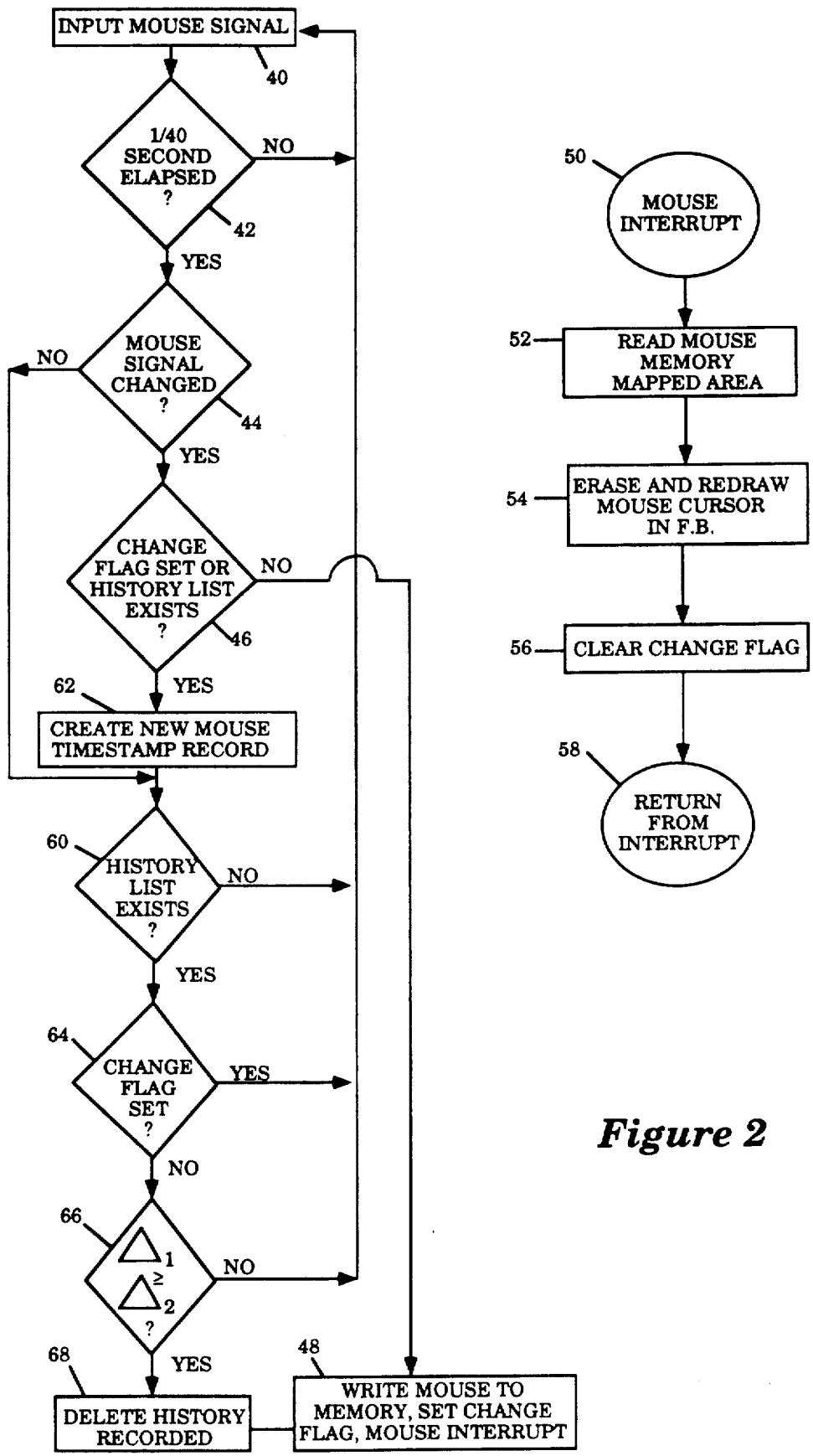
FIG. 2 is a flow chart illustrating the operation of a more sophisticated portion of an operating system in accordance with the present invention.

A second embodiment of the invention is illustrated in the flow chart of FIG. 2. The arrangement illustrated in FIG. 2 corrects these problems of the prior art. The arrangement utilizes an expanded memory mapping facility comprising an array of memory mapped tables to record the positions of the mouse during periods in which the mouse interrupt is preempted and then causes the display of all of those positions to occur at the proper rate after the preemptinq interrupt has been completed.

This embodiment of the invention may be conveniently utilized in compute systems which utilize the Unix operating system and run another operating system such as MSDOS as a window in the Unix system. Such a system is exemplified by the Sun 386i Computer manufactured by Sun Microsystems, 2550 Garcia Avenue, Mountain View, Calif.

In the preferred embodiment of the arrangement, the main portion of the program, that illustrated to the left in FIG. 2, is carried out by the Unix operating system while the mouse interrupt function is a process of the MSDOS operating system running as a window under the Unix operating system.

The program illustrated is entered after the initialization of a memory mapped position which contains the condition of the mouse last displayed. Moreover, a series of memory mapped positions comprising an array of what are referred to hereinafter as mouse history records are also initialized before the first step of the program illustrated in FIG. 2. In a preferred embodiment of the invention, these mouse history records are chronologically arranged in an array, each position of which is sufficient to contain four thirty-two bit words. These four word positions each represent the information illustrated in FIG. 3 of the drawings for one mouse condition. The program begins at a step 40 where a new mouse condition signal is received. The program moves to step 42 at which a determination is made whether one-fortieth of a second has passed since the last mouse interrupt occurred. To determine this, a comparison is made with the timestamp signal of the memory mapped position carrying the last mous position displayed. If the prescribed period has not passed, the program simply recycles to look at the incoming mouse condition signal at step 40; thus mouse interrupts may only occur each one-fortieth of a second. If the appropriate period has passed, the program moves to step 44 at which the new mouse condition signal is compared to the last recorded mouse condition signal to determine if the mouse condition has changed. With the first signal input to the system, the condition has changed, of course.

If the mouse condition has changed, the program moves to a step 46 at which a determination is made whether either a change flag has been set or a history list exists. If neither a change flag has been set nor a history list exists, the program moves to a step 48. Step 48 initializes the memory mapped area with the new mouse condition, sets the mouse interrupt change flag, and initiates a mouse interrupt.

As discussed above, in the preferred embodiment of the invention, the mouse interrupt is programmed as a separate function or subprogram (depending on the computer language involved). Such a function is illustrated to the right in the diagram of FIG. 2. The mouse interrupt function begins at step 50 and moves to a step 52 at which the mouse memory mapped area is read. From this information, the new position for the cursor is determined; and the program moves to step 54 to erase and redraw the mouse cursor in the frame buffer so that the new position may be scanned to the output display. The function then moves to step 56 at which the change flag previously set is cleared and returns from the mouse interrupt at step 58 to step 40 of the main program. In the preferred embodiment of the invention, the change flag is stored in the memory mapped area and removed by the action of the MSDOS operating system in carrying out the mouse interrupt sequence.

When the next mouse condition signal is received, if the mouse condition has not changed and one-fortieth of a second has passed, the program moves through the steps 40, 42, and 44 to a step 60 to determine whether a history list of positions (i.e., positions which have not yet been written to the display) exists. At this point, no history list exists because the first mouse condition signal (the last to occur) generated an interrupt and that mouse condition was stored and written to the frame buffer. Consequently, the program moves from step 60 to recycle to the beginning at step 40; and no mouse interrupt is generated thereby freeing the system of the necessity of restoring the mouse information and redrawing the cursor.

If the next mouse condition signal indicates a change has occurred and one-fortieth of a second has passed, the program proceeds through steps 40, 42, and 44 to step 46 at which it is determined that no change flag is set and no history list exists. Therefore, the program moves to step 48 to initiate the mouse interrupt function described above, set the change flag, store the new mouse condition in the memory mapped area, and (after the interrupt) clear the change flag and recycle to step 40. Thus, the operation of the system in response to a change in the mouse condition when no history list exists is essentially like that illustrated in FIG. 1.

If on the other hand, over one-fortieth of a second has passed and a mouse interrupt (as described above) has been initiated so that the change flag is set, and the mouse interrupt is preempted for some reason so that it has not been completed when a mouse condition is received which is changed from a last mouse condition, then the program moves through steps 40, 42, and 44 to step 46 at which the determination indicates that the change flag is set. This moves the program to a step 62 at which a new history record is created in the history list array in memory referred to above. This record contains the same information as that illustrated in FIG. 3. The program then moves to step 60 where it is determined that a history now does, in fact, exist.

Since a history list exists, indicating that there are mouse conditions stored which have not been displayed, the program moves to a step 64 at which a determination is again made whether the change flag has been set. In the present example, the flag has been set by the preempted mouse interrupt, so the program recycles to the beginning at step 40 leaving a first mouse history record stored in the mouse history list.

The program continues to treat incoming mouse condition signals in the same manner, storing those new condition signals which indicate a change from the last recorded mouse condition of the history list in the history list and recycling until the process preempting the mouse interrupt finally clears.

When the preempting condition ends and the mouse interrupt clears, the change flag is cleared in step 56 of the mouse interrupt function. Consequently, when the next mouse signal arrives at step 40, it is processed to step 44. If this new signal indicates a change in mouse condition, the program moves to step 46, finds no change flag but an existing history list, and moves to step 62 to record the new mouse condition signal in the history list.

The program then moves to step 60. The program also moves directly to step 60 from step 44 if the new mouse condition signal indicates no change from the last signal recorded on the history list. At step 60, the program determines that a history list exists and moves to step 64 where a determination is made that the change flag is not set. This moves the program to a step 66.

At step 66, the time interval between the last mouse condition recorded by the mouse interrupt function (the interrupt which has just cleared) and the time of th first record stored in history is evaluated. The actual time since the last interrupt (delta 1) is compared to the time (delta 2) between the timestamp on the last recorded interrupt mouse and the first mouse condition in the history list. The timestamp of the first event stored in the history list and th timestamp of the last mouse interrupt may be used to determine this interval, or the timestamps in the history list may be recorded on a delta (change in time) basis. Consequently, a comparison of the last mouse position generated by the mouse interrupt and the first stored event in the history list indicates whether an actual time equal to or greater than the delta 2 time has passed. If it has passed, then the first mouse condition of the history list condition is deleted from the history list and transferred to the memory mapped position at a step 68. From step 68, the program moves to step 48 to initiate the mouse interrupt sequence. On the other hand, if the time interval is not yet equal to or greater than the delta time between the last mouse condition written to the frame buffer and the first mouse condition in the history list, the program merely recycles from step 66 to the beginning at step 40 so that the first history is delayed until an appropriate time interval has passed.

The use of the history list referred to and outlined in operation in FIG. 2 provides, first, that all preempted changes of the mouse condition taking place after one-fortieth of a second has passed are stored for later recording. This eliminates the problem in which intervening mouse positions are omitted during conditions of preemption. The history list as implemented in the present invention also assures that mouse positions stored during a state in which the mouse interrupt is preempted are executed in proper time sequence so that distortions which might be caused by mouse accelerations utility programs are eliminated.

Although the present invention has been described in terms of a preferred embodiment, it will be appreciated that various modifications and alterations might be made by those skilled in the art without departing from the spirit and scope of the invention. The invention should therefore be measured in terms of the claims which follow.

We claim:

1. A computer display system for displaying graphical input data, said computer display system comprising an interruptible central processor unit ("CPU") for executing a plurality of data processing operations, said CPU coupled to a frame buffer and to a display means including a display for displaying a cursor and data provided by said CPU, and pointing means coupled to said CPU for generating a plurality of pointer signals, said computer display system comprising:

sampling means coupled to said CPU for providing a plurality of sampled pointer signals corresponding to at least one cursor position indicated by said pointing means;

memory means coupled to said CPU for storing said sampled pointer signals at least until said CPU updates said frame buffer according to said pointer signals stored in said memory means; and comparison means coupled to said memory means for comparing said sampled pointer signals with said pointer signals stored in said memory means, said comparison means further generating a pointer interrupt when said sampled pointer signals differ from said pointer signals stored in said memory means;

if said CPU is servicing said pointer interrupt and receives a higher interrupt to service, said memory means creating a history list by sequentially storing all sampled pointer signals corresponding to said cursor positions indicated by said pointing means during servicing of the higher interrupt;

after the CPU has serviced the higher interrupt, said CPU retrieving the history list from said memory means, updating said frame buffer, and redrawing the curso according to said pointer signals stored in said history list during the servicing of said higher interrupt.

2. The computer display system as set forth in claim 1, wherein said sampling means further provides a plurality of sampled switch signals produced by switch means disposed on said pointing means, said sampled switch signals corresponding to at least one cursor position indicated by said pointing means.

3. The computer display system as set forth in claim 2, wherein said memory means further stores said sampled switch signals at least until said CPU updates said frame buffer according to said switch signals stored in said memory means.

4. The computer display system as set forth in claim 2, wherein said comparison means further compares said sampled switch signals with said switch signals stored in said memory means, said comparison means further setting said flag when said sampled switch signals differ from said switch signals stored in said memory means.

5. The computer display system as set forth in claim 4, wherein if the flag is set and the CPU receives an interrupt to service, said memory means sequentially stores said sampled switch signals corresponding to said cursor positions indicated by said pointing means during the servicing of the interrupt.

6. The computer display system as set forth in claim 2, wherein said history list further comprises said sequentially stored sampled switch signals corresponding to said cursor positions indicated by said pointing means during the servicing of the interrupt.

7. The computer display system as set forth in claim 2, wherein after the CPU services the interrupt, said CPU retrieves the history list from said memory means and updates said frame buffer and redraws the cursor according to said switch signals coresponding to said intended cursor positions stored in said history list during the servicing of said interrupt.

8. The computer display system of claim 2 wherein said sampling means samples said pointer signals and said switch signals at a predetermined rate.

9. The computer display system as set forth in claim 1, wherein said computer display system further comprises clearing means coupled to said comparison means for clearing said flag after said frame buffer has been updated and said cursor positions recorded in said history list have been displayed.

10. A method for displaying graphical input data in a computer display system comprising an interuptible central processor unit ("CPU") for executing a plurality of data processing operations, said CPU coupled to a frame buffer and to display means including a display for displaying a cursor and data provided by said CPU, and pointing means coupled to said CPU for generating a plurality of pointer signals, said method comprising the steps of:

providing a plurality of sampled pointer signals corresponding to at least one cursor position indicated by said pointing means;

storing said sampled pointer signals in memory means at least until said CPU updates said frame buffer according to said pointer signals stored in said memory means;

comparing said sampled pointer signals with said pointer signals stored in said memory means;

generating a pointer interrupt when said sampled pointer signals differ from said pointer signals stored in said memory means;

if said CPU is servicing said pointer interrupt and receives a higher interrupt to service, creating a history list in said memory means by sequentially storing all sampled pointer signals corresponding to said cursor positions indicated by said pointing means during the servicing of the higher interrupt; and after the CPU has serviced the higher interrupt, retrieving the history list from said memory means, updating said frame buffer, and redrawing the cursor according to said pointer signals stored in said history list during the servicing of said higher interrupt.

11. The method as set forth in claim 10, wherein providing said plurality of sampled pointer signals further comprises providing a plurality of sampled switch signals corresponding to at least one cursor position indicated by said pointing means.

12. The method as set forth in claim 11, wherein storing said sampled pointer signals further comprises storing said sampled switch signals at least until said CPU updates said frame buffer according to said switch signals stored in said memory means.

13. The method as set forth in claim 12, wherein providing said sampled pointer signals and said switch signals occurs at a predetermined rate.

14. The method as set forth in claim 11, wherein comparing said sampled pointer signals further comprises comparing said sampled switch signals with said switch signals stored in said memory means, and further setting said flag when said sampled switch signals differ from said switch signals stored in said memory means.

15. The method as set forth in claim 14, wherein if the flag is set and the CPU receives an interrupt to service, creating said history list further comprises sequentially storing said sampled switch signals corresponding to cursor positions indicated by said pointing means during the servicing of the interrupt.

16. The method as set forth in claim 11, wherein after said CPU has serviced the interrupt, retrieving the history list from said memory means and updating said frame buffer and redrawing the cursor according to said switch signals stored in said history list during the servicing of said interrupt.

17. The method as set forth in claim 10, wherein said flag is cleared after said frame buffer has been updated and said cursor positions recorded in said history list have been displayed.

* * * * *

UNITED STATES PATENT AND TRADEMARK OFFICE
CERTIFICATE OF CORRECTION

PATENT NO. : 5,261,054
DATED : November 9, 1993
INVENTOR(S) : Lerner et al.

It is certified that error appears in the above-identified patent and that said Letters Patent is hereby corrected as shown below:

In column 10, claim 6 at line 33, please delete " 2 " and insert -- 5 --.

Signed and Sealed this

Twenty-first Day of October 1997

*Attest:*

BRUCE LEHMAN

*Attesting Officer*       *Commissioner of Patents and Trademarks*